US012723672B2

(12) United States Patent
Kröll

(10) Patent No.: US 12,723,672 B2
(45) Date of Patent: Sep. 1, 2026

(54) RETENTION CLIP FOR A VALVE SHAFT ADAPTER

(71) Applicant: Watts Regulator Co., North Andover, MA (US)

(72) Inventor: Markus Kröll, Dattenberg (DE)

(73) Assignee: Watts Regulator Co., North Andover, MA (US)

( * ) Notice: Subject to any disclaimer, the term of this patent is extended or adjusted under 35 U.S.C. 154(b) by 152 days.

(21) Appl. No.: 18/356,877

(22) Filed: Jul. 21, 2023

(65) Prior Publication Data

US 2025/0027574 A1 Jan. 23, 2025

(51) Int. Cl.
*F16K 27/00* (2006.01)
*F16B 2/22* (2006.01)
*F16B 21/18* (2006.01)

(52) U.S. Cl.
CPC ................ *F16K 27/00* (2013.01); *F16B 2/22* (2013.01); *F16B 21/183* (2013.01)

(58) Field of Classification Search
CPC .. F16K 27/00; F16B 2/248; F16B 2/24; F16B 2/245; F16B 2/22; F16B 21/183; F16B 2/243; F16B 21/18; F16L 27/073
USPC .................................................. 251/292, 291
See application file for complete search history.

(56) References Cited

U.S. PATENT DOCUMENTS 1,098,141 A 5/1914 Welch
2,371,855 A 3/1945 Sunderland
2,459,972 A 1/1949 Carleton
2,616,452 A * 11/1952 Clay .................. F16K 31/0651 251/129.21
2,883,144 A 4/1959 Kendig
2,914,288 A * 11/1959 Beller ..................... F16K 31/08 248/500
2,966,973 A 1/1961 Hayes
(Continued)

FOREIGN PATENT DOCUMENTS

CN 209725381 U 12/2019
DE 3139140 A1 8/1982
(Continued)

OTHER PUBLICATIONS

Technical Manual Model D86 Overtorque Protector, Jun. 2016, 1 pages.

(Continued)

*Primary Examiner* — Craig M Schneider
*Assistant Examiner* — Andrew J Rost
(74) *Attorney, Agent, or Firm* — Day Pitney LLP; George Chaclas; Anthony A. Kassas

(57) ABSTRACT

A retention clip secures a valve shaft adapter collar to a valve actuator. The retention clip includes a central bar having opposing arms extending therefrom. Each arm includes a resilient spring clip junction attached to the central bar, a lug coupled to the resilient spring clip for receiving pliers, and an end extending from the lug and configured for insertion through a hole in the valve shaft adapter collar into a pocket of the valve actuator for retaining the valve shaft adapter collar therein. The pliers can be used to compress and consequently retract the ends into the holes to disassociate the valve shaft adapter collar from the valve actuator and/or insert the valve shaft adapter collar into the valve actuator.

17 Claims, 10 Drawing Sheets

(56) References Cited

U.S. PATENT DOCUMENTS 3,258,985 A 7/1966 Jordan
3,290,003 A * 12/1966 Kessler ................... F16K 27/08 137/315.27
3,335,835 A 8/1967 Conlon
3,441,115 A 4/1969 Gunther
4,009,896 A * 3/1977 Brewer ............... F16L 37/0885 285/332
4,114,078 A 9/1978 Malinski et al.
4,142,704 A * 3/1979 Murray ................. F16B 21/183 248/680
4,589,629 A * 5/1986 Gaffney .................... F16K 3/08 251/310
4,593,882 A * 6/1986 West .................. G05D 23/1921 251/243
4,805,870 A * 2/1989 Mertz ................ F16K 31/0655 335/251
H636 H 6/1989 Elliott
4,860,992 A 8/1989 Aunspach
5,056,746 A * 10/1991 Parsons ................ A47B 13/021 403/328
5,111,737 A * 5/1992 Dormer ...................... F16J 1/18 92/187
5,211,455 A 5/1993 Matouka et al.
5,564,461 A 10/1996 Raymond, Jr. et al.
5,581,222 A * 12/1996 Pinaud ...................... H01F 7/06 335/278
6,179,345 B1 * 1/2001 Gensert ................. F16L 27/073 285/305
6,254,163 B1 * 7/2001 Schofield ................. B60N 2/06 296/65.13
7,540,467 B2 6/2009 Roundy
7,704,008 B2 * 4/2010 Shinozaki ............. F16B 21/186 411/530
8,632,051 B2 * 1/2014 Hasel .................... F16K 27/029 251/129.15
10,170,226 B2 * 1/2019 Nielsen ................... H01F 7/081
10,605,375 B2 3/2020 Ohashi
10,699,832 B2 * 6/2020 Wang .................... F01L 1/3442
10,914,397 B2 * 2/2021 Frey ........................ F16K 27/08
2008/0203337 A1 8/2008 Roundy
2008/0203338 A1 8/2008 Roundy
2012/0199776 A1 * 8/2012 Kreuter ................. F16K 31/045 29/525.01
2012/0211688 A1 * 8/2012 Carlson ................... F16K 27/00 251/291
2021/0180713 A1 6/2021 Mariano
2023/0139829 A1 * 5/2023 Kusala .................... F16B 2/248 251/291

FOREIGN PATENT DOCUMENTS

DE 19845684 A1 4/2000
DE 102004056515 B4 6/2006
DE 102008043878 A1 5/2010
DE 102008043883 A1 5/2010
EP 1613884 B1 8/2006
GB 2252803 B * 5/1994 .............. F16L 55/00
JP 200190859 A 4/2001
WO 2017084662 A1 5/2017
WO 2022194527 A1 9/2022

OTHER PUBLICATIONS

Valworx, Square Adapters Stainless Steel Construction, ISO5211/DIN3337 Namur, Series 5800, Aug. 2016, 2 pages.
BAR, a WATTS brand Technical data sheet, Reductions type RED for pneumatic actuators Product description, Jun. 2020, 3 pages.
EP Extended Search Report and Written Opinion corresponding to Application No. 24182915.9, dated Dec. 19, 2024, 8 pages.
EP Extended Search Report corresponding to Application No. 24189013.6, dated Jan. 2, 2025, 11 pages.

* cited by examiner

RETENTION CLIP FOR A VALVE SHAFT ADAPTER

FIELD OF THE DISCLOSURE

The subject disclosure relates valve actuators, and more particularly to adapters and mechanisms for connecting a valve actuator to a valve stem.

BACKGROUND

A variety of systems today include valves, and more particularly, actuatable valve assemblies. Buried sprinkler systems, for example, often include actuatable valves to control irrigation to lawns and other plants in both residential and commercial settings. In another example, fire prevention sprinkler systems often include one or more actuatable valves. Many HVAC systems include actuatable valves such as air dampers, water valves, gas valves, ventilation flaps, louvers, and/or other actuatable valves that help regulate or control the flow of fluid (e.g., liquid or gas) in the HVAC system.

Many actuatable valves have a rotary axle or shaft that, during use, is actuated by a drive unit such as an electric motor within a valve actuator. In a direct coupled actuator, a shaft adapter is often configured to be placed over and coupled to the axle or shaft of the actuatable valve. Once installed, the drive unit may, through the shaft adapter, transmit a torque to the axle or shaft to actuate the valve. The likes of an example actuator, as referenced herein, is described in PCT/EP2022/055023, filed Feb. 28, 2022 and published as WO 2022/194527 A1 on Sep. 22, 2022, the entirety of which is incorporated herein by reference for any purpose whatsoever.

When an automated actuator is assembled, it is common for the connection between the actuator and valve to be bridged using a valve shaft adapter or reducing sleeve. The valve shaft adapter is simply placed on the valve shaft to encompass the shaft, but can be lost as long as the actuator and valve are not affixed to each other. Existing valve shaft adapters are not loss-proof and, as such, there is a risk that the reducing sleeve will be lost during the assembly or repair of an automated valve and that the function of the assembly will no longer be operational. As such, there is a need for a loss-proof reduction sleeve.

SUMMARY

In view of the above, a need exists for an adapter that quickly and easily insures coupling to the actuator to prevent loss and, when desired, can be removed.

In one embodiment, a retention clip secures a valve shaft adapter collar to a valve actuator. The retention clip includes a central bar having opposing arms extending therefrom. Each arm includes a resilient spring clip junction attached to the central bar, a lug coupled to the resilient spring clip for receiving pliers, and an end extending from the lug and configured for insertion through a hole in the valve shaft adapter collar into a pocket of the valve actuator for retaining the valve shaft adapter collar therein. The pliers can be used to compress and consequently retract the ends into the holes to disassociate the valve shaft adapter collar from the valve actuator and/or insert the valve shaft adapter collar into the valve actuator.

Preferably, the resilient spring clip junction is configured to contact interior sidewalls of the valve shaft adapter collar to stabilize the retention clip upon engagement of the retention clip with the valve shaft adapter collar. The ends may couple into an annular groove formed in the pocket.

In another embodiment, a retention clip includes a central bar and opposing arms extending from the central bar. Each arm defines a scaffolding support structure configured to cradle the valve shaft adapter collar as well as an ear extending outward from the collar, a resilient spring clip junction configured to allow the ear to move inward, and a lug for receiving pliers to selectively retract the ear from engagement with the valve actuator. Preferably, the resilient spring clip junction of each opposing arm forms a degree of bend ranging from 90 degrees to 180 degrees relative to a parallel of the central bar. Each opposing arm may be configured to compress towards the central bar via application of pressure to each lug, consequently increasing the degree of bend of each resilient spring clip junction. The valve actuator defines a pocket for receiving the valve shaft adapter collar and an annular groove for receiving the ears.

In another embodiment, a valve shaft adapter assembly secures to a valve actuator. The valve shaft adapter assembly includes a collar and a retention clip having a central bar with opposing arms. Each arm defines a support structure configured to secure the retention clip to the collar, an end portion flexibly coupled to the support structure and configured to extend from the collar for coupling the collar to the valve actuator, and a lug for receiving pliers to selectively compress and consequently inwardly retract the end portion to couple the collar to the valve actuator. The valve actuator preferably defines a pocket sized and configured to receive the collar, and a relatively larger annular groove sized and configured to receive the end portion. The end portion may be flexibly coupled by a resilient spring clip junction having a complimentary shape to an inner corner of the collar. The central bar can flexes to exert an outward spring force against opposite corners of the collar. In one embodiment, the end portions feed through holes defined by the collar so that an exposed tip extends beyond an outer surface of the collar.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figure 1:
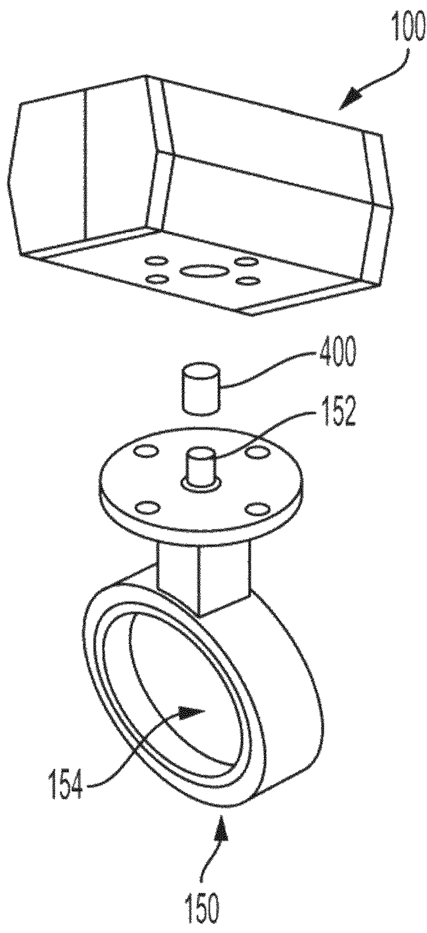
FIG. 1 illustrates a partially exploded view of a pivot valve actuator connected to a valve via a valve shaft adapter in accordance with the subject technology.

The subject technology overcomes many of the prior art problems associated with valve actuators and valve shaft adapters. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Referring now to FIG. 1, a valve actuator 100 connected to a valve assembly 150 with a valve shaft adapter 400 is shown in a partially exploded view. The valve shaft adapter 400 acts to bridge the connection between the valve actuator 100 and the valve stem 152, enabling the efficient transfer of motion from the actuator 100 to the valve assembly 150 to control position of the valve element 154. As shown, the valve actuator 100 is a part-turn actuator such as shown in U.S. Ser. No. 18/347,800 entitled A TORQUE LIMITER FOR VALVE ACTUATORS, filed on Jul. 6, 2023, the entirety of which is incorporated herein by reference for any purpose whatsoever.

Figure 2B:
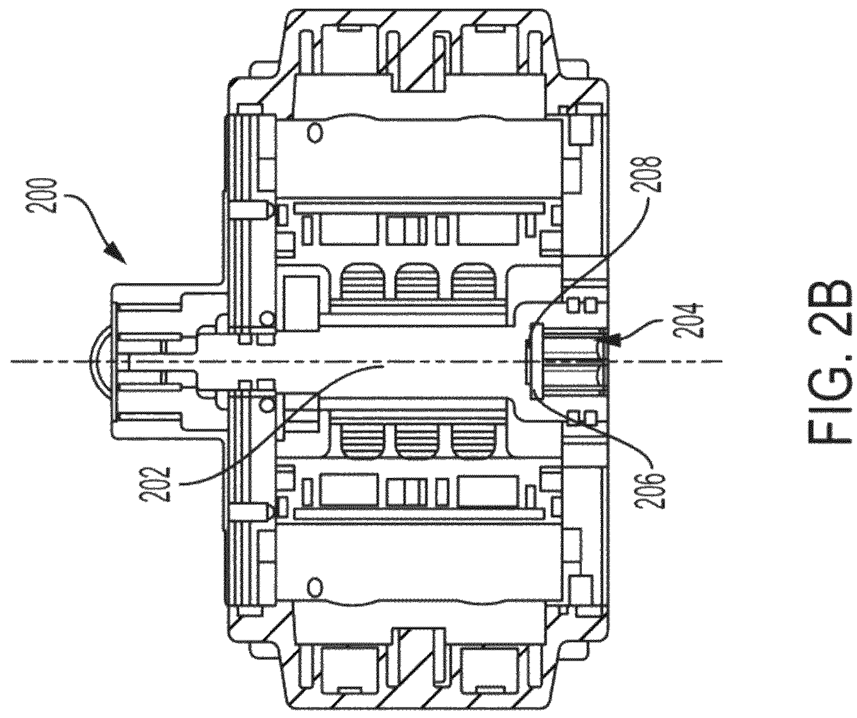
FIGS. 2A and 2B show cross-sectional views of a pivot valve actuator in accordance with the subject technology.
Figure 2A:
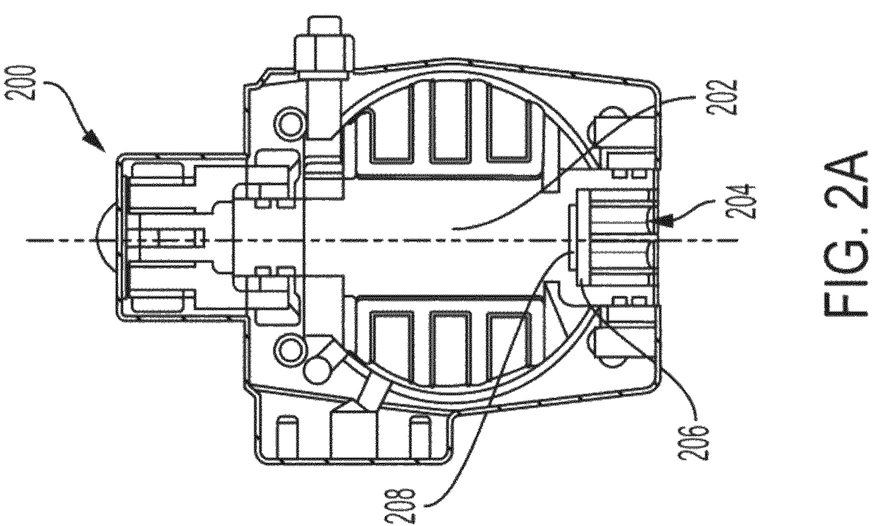

Referring now to FIGS. 2A and 2B, cross-sectional views of another valve actuator 200 are shown. The valve actuator 200 includes a plurality of components not described in detail herein for brevity. For reference, see the pivot valve actuator described in International Application No. PCT/EP2022/055023 entitled PIVOT ACTUATOR.

As best seen in FIGS. 2A and 2B, the valve actuator 200 has an internal pinion or drive shaft 202 forming a pocket 204. The pocket 204 is sized and configured to receive a valve stem. Preferably, the pocket 204 defines a relatively larger annular groove 206, shown at the upper closed end 208. However, the various valve stems may differ so that often the pocket is not properly sized. Since the drive shaft and valve stem are difficult to change, valve shaft adapters are often utilized to create the necessary match.

Figure 3:
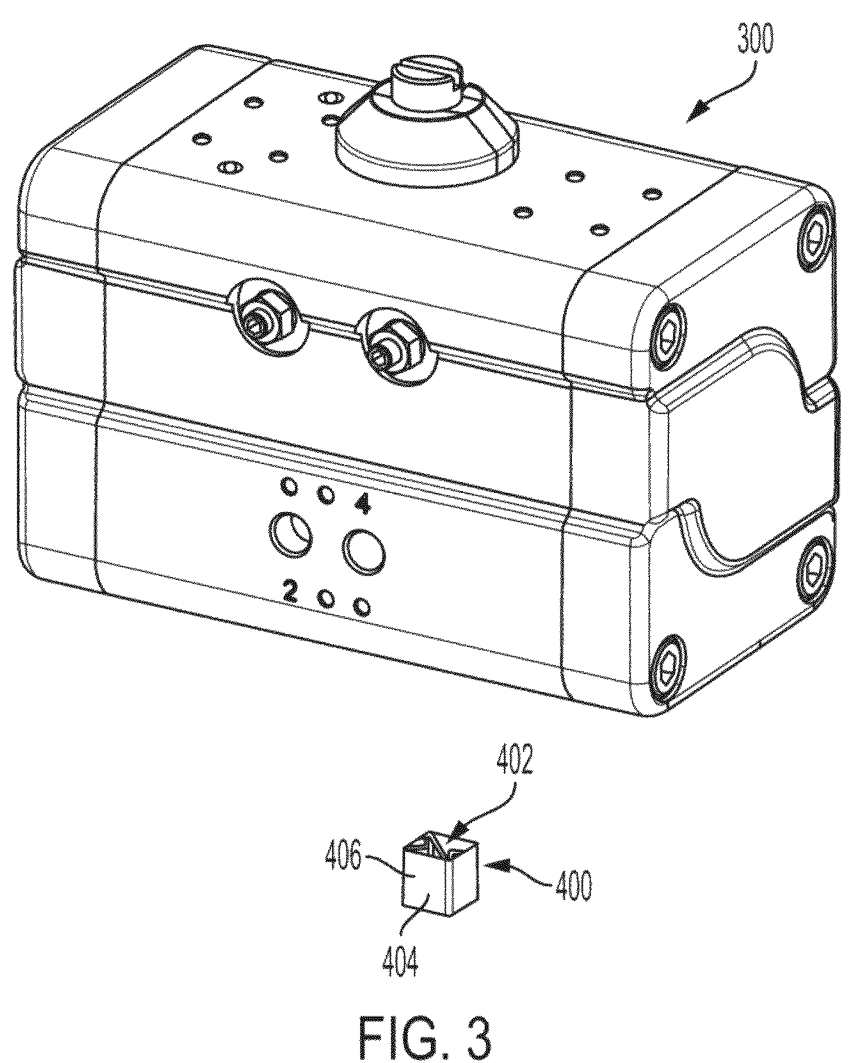
FIG. 3 shows a perspective view of still another pivot valve actuator and a valve shaft adapter in accordance with the subject technology.
Figure 4:
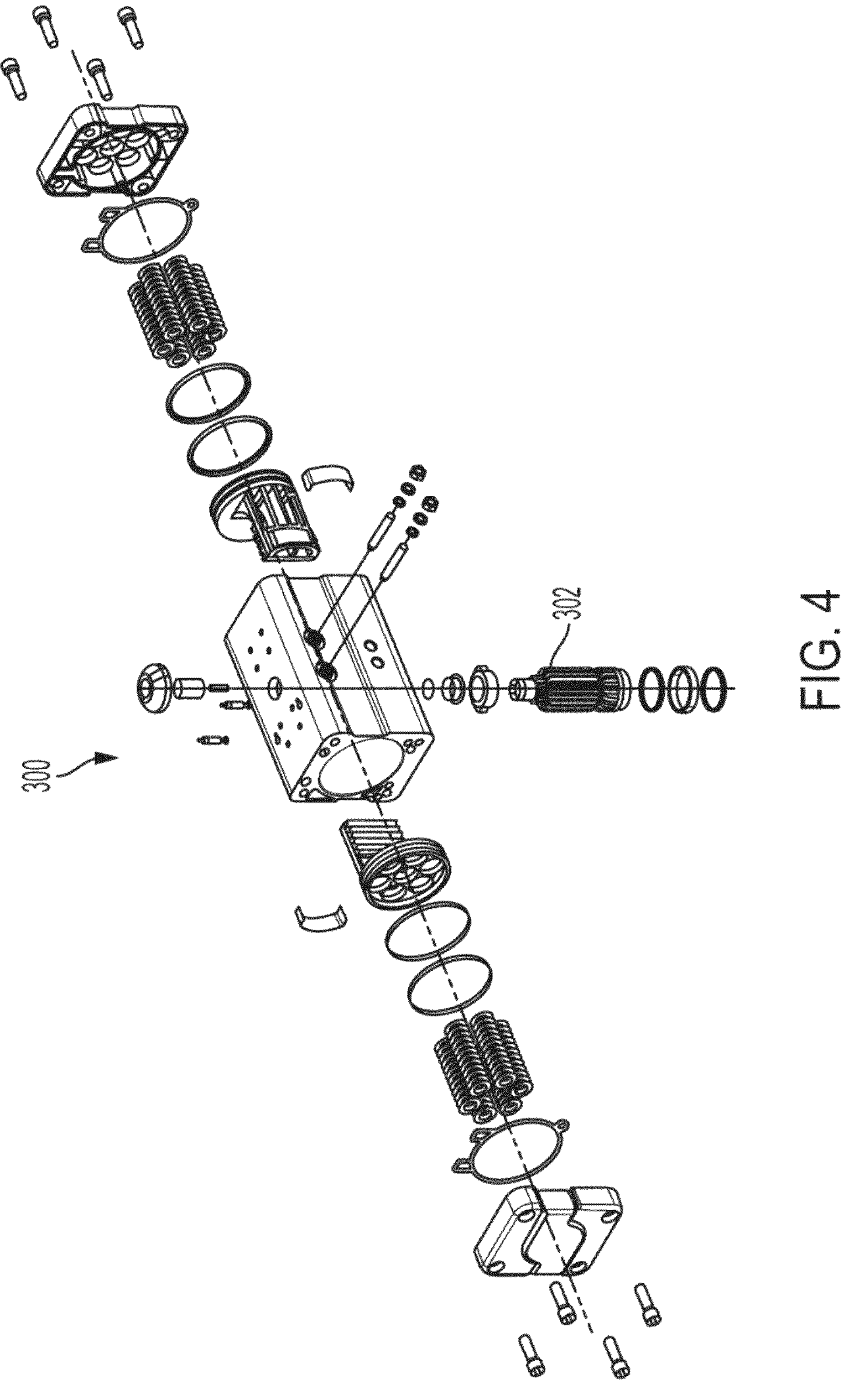
FIG. 4 illustrates an exploded view of the pivot valve actuator of FIG. 3.

Referring now to FIGS. 3 and 4, perspective and exploded views of still another pivot valve actuator 300 and a valve shaft adapter assembly 400 are shown. The valve actuator 300 has a pinion shaft 302 that defines a pocket 304 (see FIG. 6) for axial insertion of the valve shaft adapter assembly 400 while the valve shaft adapter assembly 400 includes a collar 406 that defines a cavity 402 for the valve stem (not shown). In other words, to bridge the connection between the valve stem and pinion shaft 302, the valve stem snugly fits within the cavity 402 and an outer surface 404 of the valve shaft adapter assembly 400 fits snugly within the pocket 304 of the pinion shaft 302. This bridging ensures a secure and rigid connection that allows the transfer of torque from the actuator assembly 300 to the adapter assembly 400 to the valve stein.

In another embodiment, the outer surface of the adapter assembly is eight or some other number of sides rather than four sided to match or complement the size and shape of a desired pocket in a pinion shaft. The valve shaft adapter assembly 400 can be designed to ensure proper alignment and secure connection between the actuator assembly 300 and the valve. The valve shaft adapter assembly 400 may include features such as keyways, set screws, or clamping mechanisms to prevent slippage or misalignment during operation. That said, traditional reduction sleeves freely move axially and thus are prone to being lost.

Figure 5:
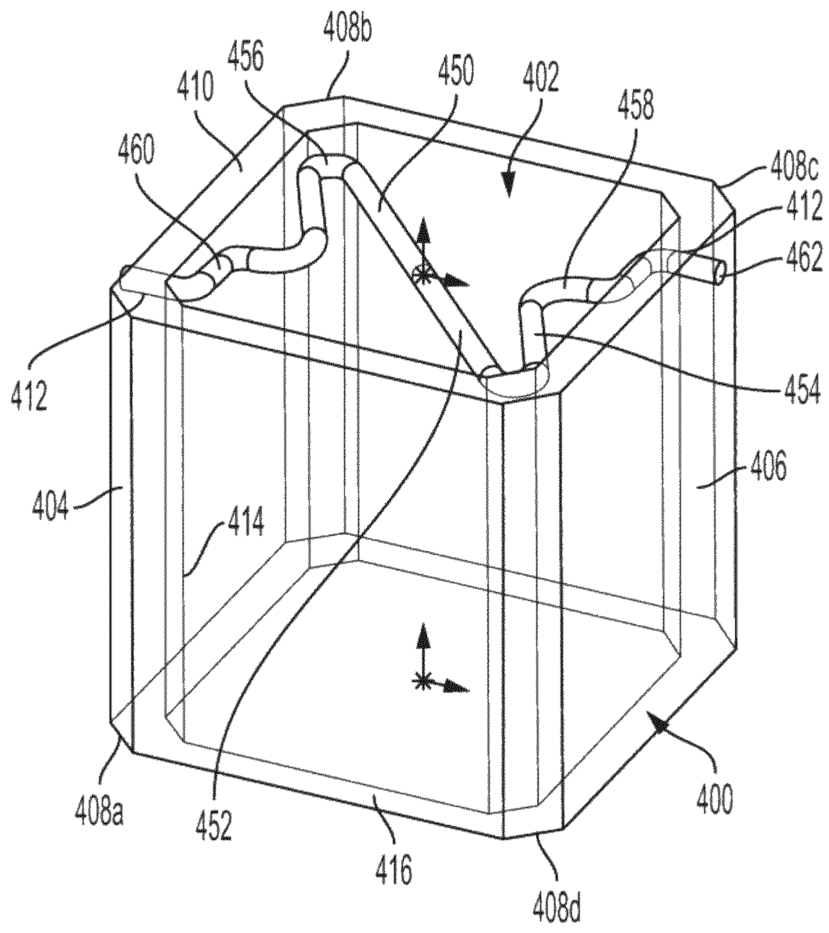
FIG. 5 shows a partially transparent, perspective view of the valve shaft adapter assembly of FIG. 3, including a first embodiment of a retention clip in accordance with the subject technology.

FIG. 5 shows an isolated perspective view of the valve shaft adapter 400 of FIG. 4 in partial transparency for illustration. It is envisioned that valve shaft adapter 400 is fabricated from opaque material but the valve shaft adapter 400 may also be fabricated from clear material. The collar 406 of the valve shaft adapter 400 is a substantially square tube with beveled corners 408_a-d_. The length of the collar 406 is preferably about equal to a depth of the pocket 304 of the pinion shaft 302 but the collar 406 may also be longer or shorter. The collar 406 has an upper end 410 meant to be inserted first into the pocket 304. The upper end 410 forms opposing holes 412 adjacent opposing corners 408_a_, 408_c_. The holes 412 are pass through holes preferably formed by drilling.

The valve shaft adapter 400 also includes a retention clip 450 in accordance with the subject technology. The retention clip 450 is a tubular piece of scaffolding, typically formed from a single rod of flexible material having a diameter ranging between 0.01-1.0 inches. The retention clip 450 has a central bar 452 with two opposing arms 454. It should be understood, however, that the retention clip 450 can be fully integrated or assembled piecewise. The opposing arms 454 are shown as similarly shaped but such is not required.

Each arm 454 defines a resilient spring clip junction 456 shaped as an arcuate corner or 'u-shape' with a degree of bend ranging from 90 degrees to 180 degrees or more relative to the central bar 452. As such, each resilient spring clip junction 456 forms a complimentary shape to an inner surface 414 of the corners 408_a-d_. As shown, the resilient spring clip junctions 456 contact the inner surface 414 of opposing corners 408_b_, 408_d_ of the collar 406. Specifically, the resilient spring clip junction 456 can contact opposite corners 408_b_, 408_d_ to lodge the retention clip 450 in the collar 406. Further, the central bar 452 may also flex to exert an outward spring force against the opposite corners 408_b_, 408_d_, and thus provide a stabilizing force for the retention clip 450 within the collar 406.

Still referring to FIG. 5, the resilient spring clip junction 456 extends to a lug 458. The lugs 458 are arcuate sections configured for receiving tips of circlip pliers or the like to compress each junction 456 so that the opposing arms 454 compress towards the central bar 452. In other words, the lugs 458 allow use of a common tool to selectively increase the degree of bend of each resilient spring clip junction 456. Each opposing arm 454 terminates in a bent end 460. The ends 460 feed through the holes 412 defined by the collar 406 so that an exposed tip 462 extends beyond the outer surface 404.

Figure 6A:
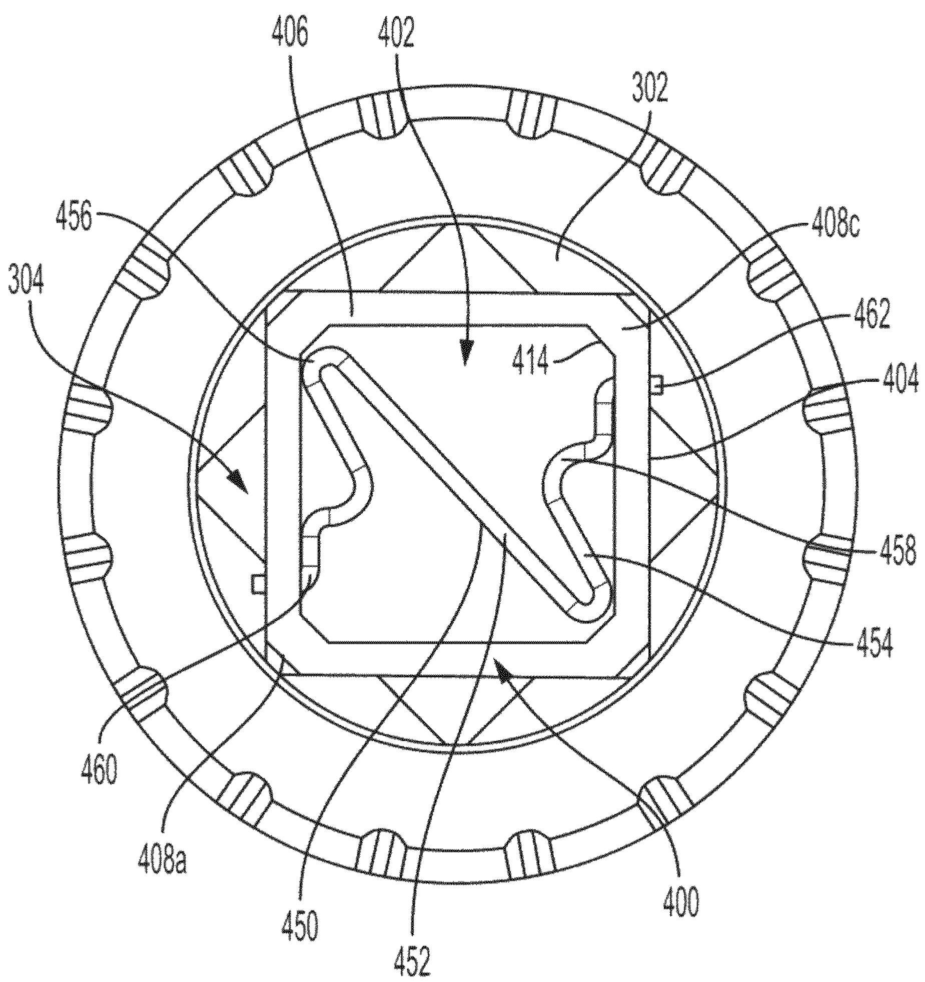
FIG. 6A shows top view of the valve shaft adapter assembly of FIG. 5A in a valve shaft pocket in accordance with the subject technology.
Figure 6B:
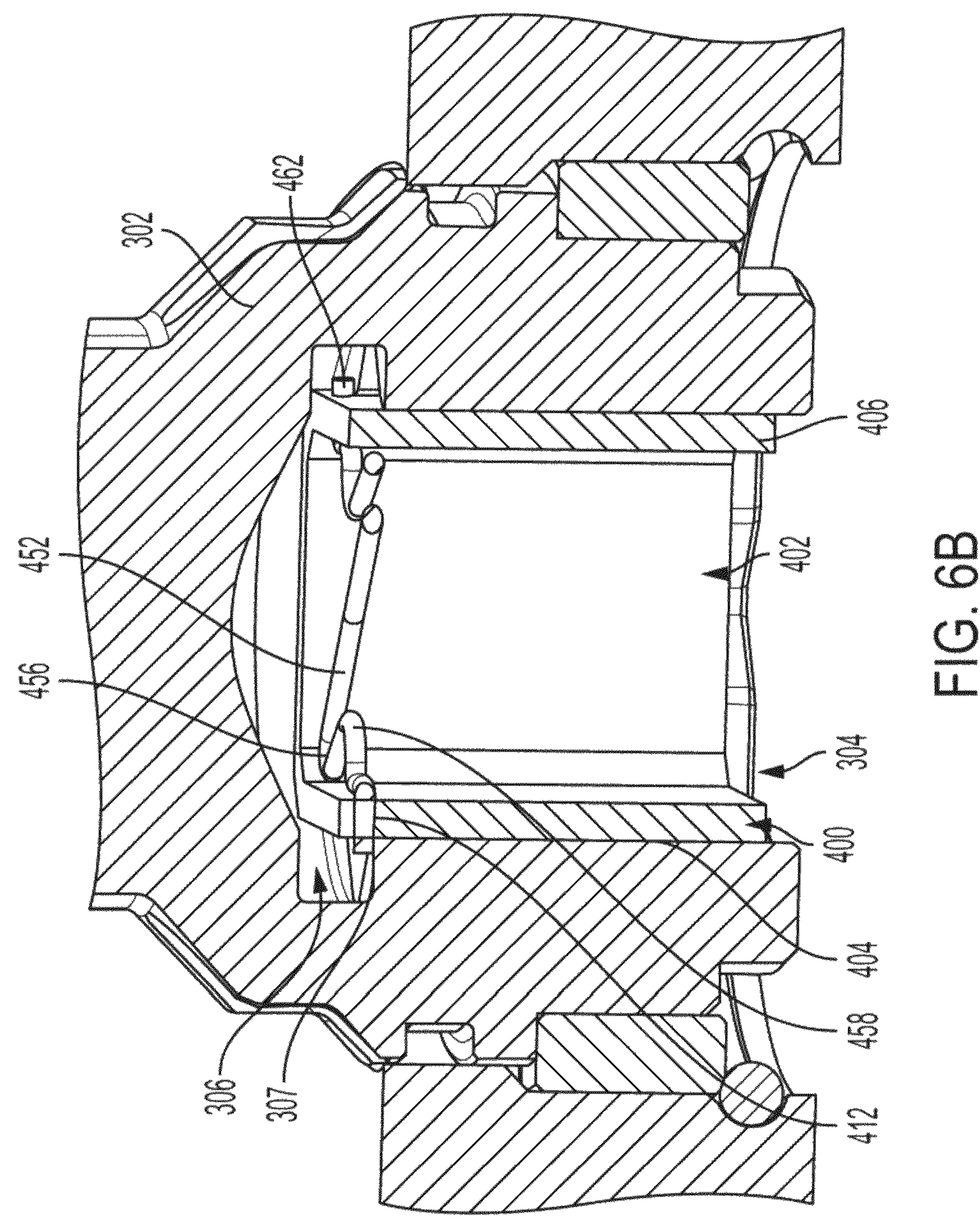
FIG. 6B shows a cross-sectional view of the valve shaft adapter in a valve shaft pocket in accordance with the subject technology.

FIGS. 6A and 6B show top and cross-sectional views of a pinion shaft 302 of the pivot valve actuator 300 connected to the valve shaft adapter assembly 400 in accordance with the subject technology. Normally, the pinion shaft 302 imputes rotational torque to the exterior surface 404 of the collar 406. As can be seen, the pocket 304 is star shaped with 16 sides but 4, 8 or some other number of sides is possible.

To install the retention clip 450 to the collar 406, circlip pliers (not shown) are inserted into the lugs 458 of the retention clip 450 to compress the retention clip 450. While compressed, the retention clip 450 can be inserted into the collar 406 to align the tips 462 to the holes 412. Once aligned, the pressure applied by the pliers can be released so that the tips 462 pass into and through the holes 412.

To install the adapter assembly 400 in the actuator assembly, circlip pliers (not shown) are again inserted into the lugs 458 of the retention clip 450 to withdraw the exposed tips 462 at least into the drilled hole 412 of the collar 406. In other words, the pliers apply pressure and compress each opposing arm 454 towards the central bar 452 by increasing the degree of bend of each resilient spring clip junction 456 so that the arms 454 retract and the tips 462 move radially inward within the holes 412 defined by the collar 406. With the tips 462 retracted, the valve shaft adapter assembly 400 is freely insertable into the pocket of the pinion shaft 302 of the valve actuator assembly 300. As the retainer clip 450 is near the upper end 410 of the collar 406, the upper end 410 is inserted first.

Once the adapter assembly 400 is inserted into the pocket 304, the pliers may be used to further insert the adapter assembly 400 or removed. A lower end 416 of the collar may simply be pushed to further insert the adapter assembly 400. Due to the resilient elasticity of the retention clip 450, once the holes 412 align with the annular groove 306, the tips 462 pop out into the annular groove 306 to complete assembly.

When assembled together, the retention clip 450 engages the annular groove 306 of the pocket 304 to prevent loss of the adapter assembly 400. More specifically, the exposed tips 462 of the retention clip 450 extend into the annular groove 306 so that a lower ledge 307 acts as a stop or shelf to prevent retracting the adapter assembly 400 from the pocket 304. In other words, the exposed tips 462 are trapped or captured so that the adapter assembly 400 is captured in the radial pocket 304 and will not fall out (i.e., be unintentionally misplaced or lost during repair or assembly) without deformation of the retention clip 450 or destruction of the tips 462 and/or pocket 304.

To remove the adapter assembly 400 from the pocket 304, the circlip pliers can again be inserted into the lugs 458 to inwardly compress the arms 454 of the retention clip 450. This inward motion retracts the tips 462 from the annular groove 306 into the holes 412 so that the adapter assembly 400 may slide out of the pocket 304 as if there were no retention clip 450. The pliers can also be used to withdraw the adapter assembly 400 once the tips 462 are retracted.

Figure 7:
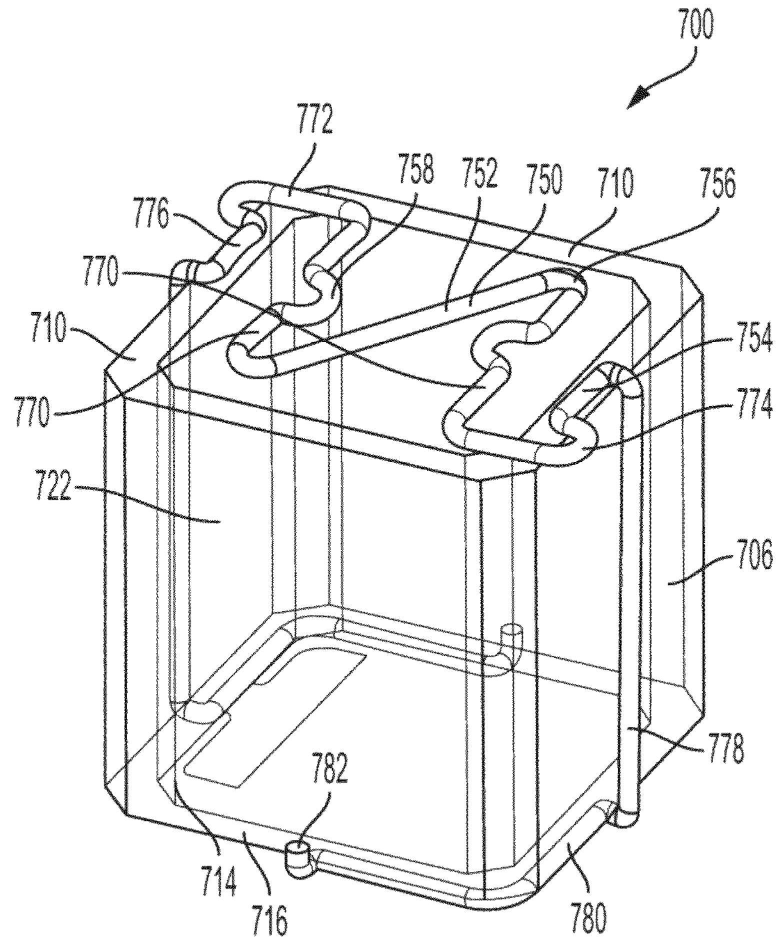
FIG. 7 shows a partially transparent, perspective view of another valve shaft adapter assembly in accordance with the subject technology.

FIG. 7 shows a partially transparent, perspective view of another valve shaft adapter assembly 700 in accordance with the subject technology. The second embodiment of the adapter assembly 700 differs from the first embodiment of the adapter assembly 400 in that the adapter assembly 700 does not have ends that feed through holes. Rather, the adapter assembly 700 has a retention clip 750 with a support structure configured to cradle the collar 706 of the valve shaft adapter assembly 700. The following description is directed primarily to the differences between these embodiments with like reference numerals used where possible.

The retention clip 750 is still tubular resiliently flexible wire. The retention clip 750 has a central bar 752 with two opposing arms 754. Each opposing arm 754 also defines a resilient spring clip V-shaped junction 756. As shown, the degree of bend of the V-shaped junctions 756 is 45 degrees relative to the central bar 752. A jog 770 extends from each junction 756 mostly parallel the respective inner surface 714. Each jog 770 forms a lug 758.

A bent portion 772 extends outward from each jog 770 and includes a semi-circular ear 774 and a straight section 776. The straight section 776 aligns with the upper end 710 of the collar 706. A chute section 778 depends from the straight section 776 along a full length of the collar 706 with a turned bow section 780 that aligns with the lower end 716 of the collar 706. The bow section 780 terminates in an upwardly bent end 782. Due to the shape and length, the ear 774 extends beyond an outer circumference of the collar 706.

Still referring to FIG. 7, the retention clip 750 cradles the collar 706 between the opposing arms 754. As can be seen, the retention clip 750 contacts all four exterior sidewalls 722 as well as the upper and lower ends 710, 716. No holes are required in the collar 706. Thus, the retention clip 750 may be easily used on existing collars without modification.

Figure 8A:
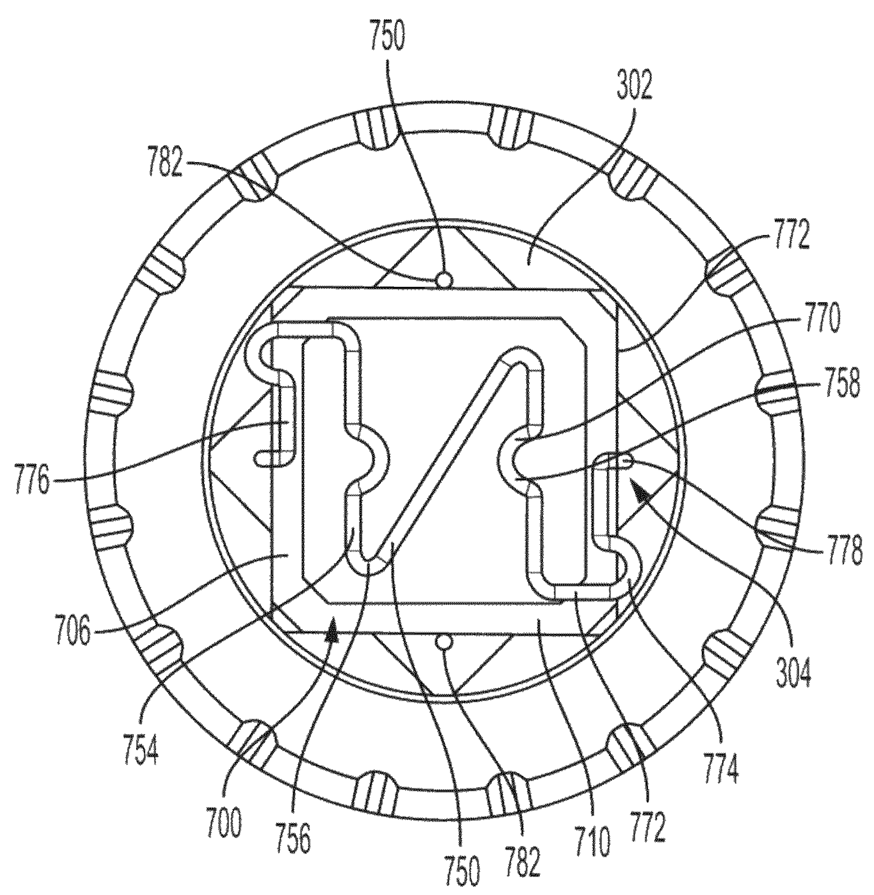
FIG. 8A shows a top view of the valve shaft adapter assembly coupled to a pinion shaft in accordance with the subject technology.
Figure 8B:
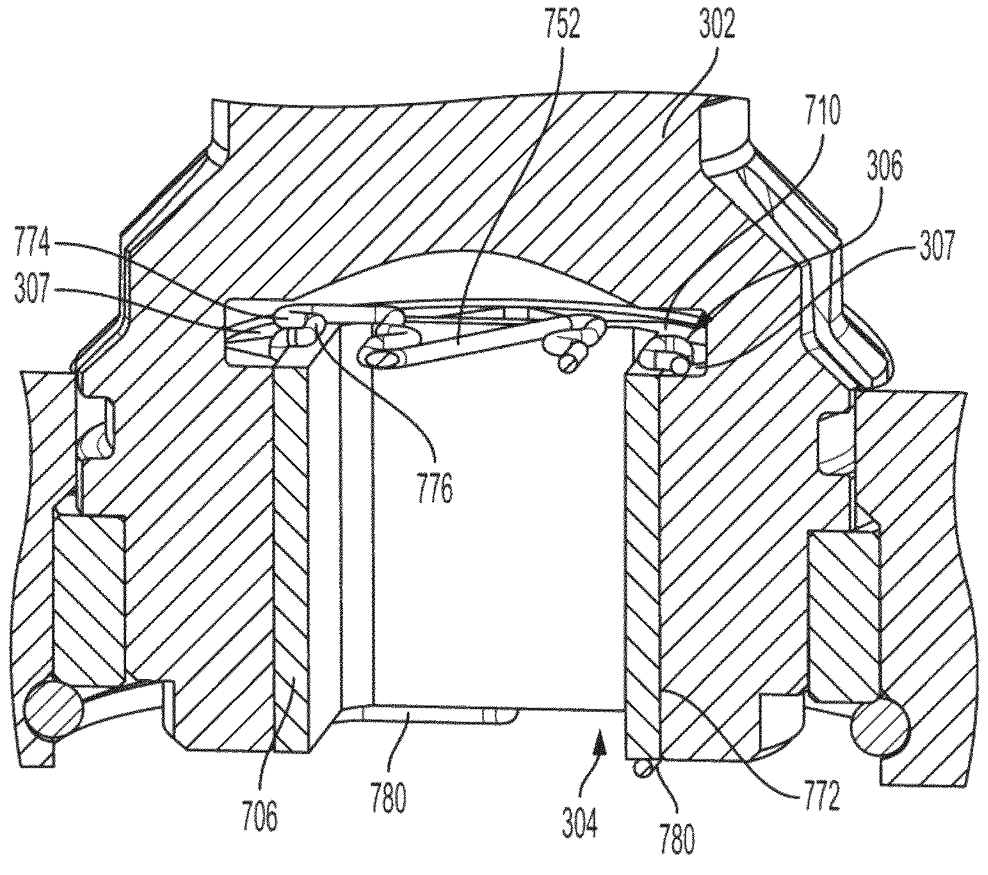
FIG. 8B shows a cross-sectional view of the valve shaft adapter assembly coupled to a pinion shaft in accordance with the subject technology.

FIGS. 8A and 9A show a top view and cross-sectional view, respectively, of the valve shaft adapter assembly 700 coupled to a pinion shaft 302 in accordance with the subject technology. As mentioned with reference to FIG. 6, the pinion shaft 302 defines an internal pocket 304 with an upper annular groove 306. The ear 774 of the retention clip 750 is configured for engagement within the annular groove 306 of the pinion shaft 702 to retain the adapter assembly 700 to the actuator assembly.

To install the retention clip 750 to the collar 706, circlip pliers (not shown) may be inserted into the ears 774 of the retention clip 750 to expand the retention clip 750. While expanded, the retention clip 750 can be placed around the collar 706 approximate to the desired position. Once positioned, the expanding pressure applied by the pliers can be released so that the retention clip 750 wraps around the collar 706 as shown in FIG. 7.

The installation of the valve shaft adapter assembly 700 is somewhat similar to the embodiments described above even though the structure is quite different. To install the adapter assembly 700 in the actuator assembly, circlip pliers are inserted into the lugs 758 of the retention clip 750 to compress the retention clip 750 and, thereby, draw the ears 774 inward. With the ears 774 being closer together, the valve shaft adapter assembly 700 can be inserted into the pocket 304 of the pinion shaft 702 of the valve actuator assembly. As the ears 774 are near the upper end 710 of the collar 706, the upper end 710 is inserted first.

Once the adapter assembly 700 is inserted into the pocket 304, the pliers may be used to further insert the adapter assembly 700 or removed. A lower end 716 of the collar may also simply be pushed to further insert the adapter assembly 700. Due to the resilient elasticity of the retention clip 750, once the ears 774 align with the annular groove 306, the ears 774 pop into the annular groove 306 to complete assembly.

When assembled together, the ears 774 of the retention clip 750 engage a bttome surface or shelf 307 of the annular groove 306 of the pocket 304 to prevent loss of the adapter assembly 700 and, again the annular groove 306 acts as a stop to prevent retracting the adapter assembly 700 from the pocket 304.

To remove the adapter assembly 700 from the pocket 304, the circlip pliers can again be inserted into the lugs 758 to inwardly compress the arms 754 of the retention clip 750. This inward motion retracts the ears 774 from the annular groove 306 so that the adapter assembly 700 may slide out of the pocket 304 as if there were no retention clip 750. The pliers can also be used to withdraw the adapter assembly 700 once the ears 774 are retracted.

In another embodiment, the pocket of the pinion shaft does not have an annular groove. As a result, the collar is simply held in place by friction created by the tips or ears. The collar may not be just square shaped but rather any number of sides such as 3, 5, 6, 8 and the like. The pocket additionally may also have any shape and number of sides to interact in a complimentary manner with the adapter assembly.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., valve actuators, valves, valve shaft adapters, and the like) shown as distinct for purposes of illustration can be incorporated within other functional elements in a particular embodiment. Also, for clarity and brevity, some functional elements, such as o-ring seals and the like, shown in the figures are not described as one of ordinary skill in the art would appreciate the function solely upon review the subject disclosure and figures.

While the subject technology has been described with respect to various embodiments, those skilled in the art will readily appreciate that various changes and for modifications can be made to the subject technology without departing from the scope of the present disclosure.

What is claimed is:

1. A valve shaft adapter assembly, comprising:

a valve actuator defining a pocket and an internal annular groove in the pocket, the internal annular groove including an axially facing shelf;

a valve shaft adapter collar received in the pocket and defining opposing holes; and a retention clip mounted to the valve shaft adapter collar and securing the valve shaft adapter collar to the valve actuator, the retention clip comprising:

a central bar having opposing arms extending therefrom, each arm including:

a resilient spring clip junction attached to the central bar;

a lug coupled to the resilient spring clip junction and defining a pair of inwardly facing tool-receiving recesses configured to receive opposing tips of circlip pliers; and an end extending from the lug and passing through a respective one of the opposing holes of the valve shaft adapter collar and having an exposed tip extending beyond an outer surface of the valve shaft adapter collar, the resilient spring clip junctions resiliently bias the ends radially outward such that, with the valve shaft adapter collar received in the pocket, the exposed tips project radially outward beyond the outer surface of the valve shaft adapter collar into the internal annular groove and engage the axially facing shelf to retain the valve shaft adapter collar in the pocket;

wherein each arm is configured to:

compress relative to a degree of bend of the resilient spring clip junction, toward the central bar, in response to engagement of circlip pliers with the inwardly facing tool-receiving recesses of the lug, to withdraw the exposed tips radially inward through the respective hole and retract the ends from engagement with the axially facing shelf and disassociate the valve shaft adapter collar from the valve actuator; and decompress relative to the degree of bend of the resilient spring clip junction, away from the central bar, upon removal of the circlip pliers, to allow the exposed tips to re-enter the internal annular groove and re-engage the axially facing shelf to retain the valve shaft adapter collar in the valve actuator.

2. The valve shaft adapter assembly of claim 1, wherein the inwardly facing tool-receiving recesses are spaced apart and dimensioned to receive opposing tips of circlip pliers to draw the opposing arms toward one another and retract the exposed tips into the respective holes.

3. The valve shaft adapter assembly of claim 1, wherein the resilient spring clip junctions contact interior sidewalls of the valve shaft adapter collar to stabilize the retention clip within the valve shaft adapter collar.

4. The valve shaft adapter assembly of claim 1, wherein the exposed tips are received within the internal annular groove such that the axially facing shelf prevents axial withdrawal of the valve shaft adapter collar from the pocket.

5. The valve shaft adapter assembly of claim 1, wherein the retention clip forms a tubular scaffold surrounding the valve shaft adapter collar.

6. The valve shaft adapter assembly of claim 1, wherein the exposed tips engage the axially facing shelf to define a mechanical stop preventing axial removal of the valve shaft adapter collar from the valve actuator absent compression of the opposing arms.

7. A valve shaft adapter assembly, comprising:

a valve actuator defining a pocket and an internal groove;

a valve shaft adapter collar received in the pocket and defining opposing holes; and a retention clip mounted to the valve shaft adapter collar, the retention clip comprising:

a central bar; and opposing arms extending from the central bar, the arms forming a scaffolding support structure cradling at least four sides of the valve shaft adapter collar, each arm being configured to lie along a respective side of the valve shaft adapter collar and to cooperate with the central bar to define a generally tubular cage around the valve shaft adapter collar, each arm defining:

an ear extending outward relative to the valve shaft adapter collar in a decompressed state and extending through a respective one of the opposing holes in the valve shaft adapter collar and into the internal groove of the valve actuator; and oppositely disposed lugs relative to the central bar for receiving clamping pressure from pliers to compress the ears inward toward the central bar and retract the ears at least partially from the internal groove to permit removal of the valve shaft adapter collar from the valve actuator.

8. The valve shaft adapter assembly of claim 7, wherein the retention clip further comprises a resilient spring clip junction having a degree of bend enabling the lugs to compress inward toward the central bar, the degree of bend ranging from 90 degrees to 180 degrees relative to a parallel of the central bar.

9. The valve shaft adapter assembly of claim 7, wherein each ear retains the valve shaft adapter collar in the internal groove of the valve actuator by extending outward relative to the valve shaft adapter collar in a decompressed state into the internal groove, wherein a shelf of the internal groove acts as a stop to prevent axial removal of the valve shaft adapter collar from the valve actuator.

10. A valve shaft adapter assembly for securement to a valve actuator, the valve shaft adapter assembly comprising:

a collar having opposing corners; and a retention clip having a central bar with opposing arms, each arm defining:

a resilient spring clip junction shaped as an arcuate corner, wherein the central bar extends between the opposing corners so that the resilient spring clip junctions contact an inner surface of the opposing corners to lodge the retention clip in the collar;

an end portion configured to extend from the collar for coupling the collar to the valve actuator; and a lug for receiving pliers to selectively compress and consequently inwardly retract the end portion to couple the collar to the valve actuator.

11. The valve shaft adapter assembly of claim 10, wherein the valve actuator defines: a pocket configured to receive the collar; and an annular groove sized and configured to receive the end portion.

12. The valve shaft adapter assembly of claim 10, wherein the end portion is flexibly coupled by the resilient spring clip junction, the resilient spring clip junction having a complementary shape to the opposing corners of the collar.

13. The valve shaft adapter assembly of claim 12, wherein the central bar flexes to exert an outward spring force against the opposing corners.

14. The valve shaft adapter assembly of claim 10, wherein the end portions feed through holes defined by the collar so that exposed tips of the end portions extend beyond an outer surface of the collar.

15. The valve shaft adapter assembly of claim 10, wherein each end portion couples the collar to the valve actuator by decompressing and consequently outwardly extending into a groove of the valve actuator, a shelf of the groove of the valve actuator acting as a stop to prevent axial removal of the collar from the valve actuator.

16. A valve shaft adapter assembly, comprising:

a valve actuator defining a pocket and an internal annular groove in the pocket, the internal annular groove including an axially facing shelf;

a valve shaft adapter collar received in the pocket and defining opposing holes; and a retention clip mounted to the valve shaft adapter collar and securing the valve shaft adapter collar to the valve actuator, the retention clip comprising:

a central bar extending along an axis having arms extending therefrom in a plane, each arm extending on an opposing side of the axis, each arm including:

a resilient spring clip junction attached to the central bar and defining a localized bend region about which the arm is elastically deflectable toward and away from the central bar;

a lug coupled to the resilient spring clip junction and defining a pair of inwardly facing tool-receiving recesses configured to receive opposing tips of circlip pliers; and an end portion extending from the lug and passing through a respective one of the opposing holes of the valve shaft adapter collar and having an exposed tip extending beyond an outer surface of the valve shaft adapter collar, wherein the resilient spring clip junctions resiliently bias the end portions radially outward such that, with the valve shaft adapter collar received in the pocket, the exposed tips project radially outward beyond the outer surface of the valve shaft adapter collar into the internal annular groove and engage the axially facing shelf to retain the valve shaft adapter collar in the pocket, and wherein compression of the arms toward the central bar via engagement of circlip pliers with the inwardly facing tool-receiving recesses causes elastic deformation at the localized bend regions such that the end portions are translated radially inward through the respective holes and withdraw the exposed tips from engagement with the axially facing shelf in a symmetric manner about the axis due to the arms extending on opposing sides of the axis.

17. The valve shaft adapter assembly of claim 16, wherein each exposed tip engages the axially facing shelf to define a mechanical stop preventing axial removal of the valve shaft adapter collar from the valve actuator absent compression of the arms.

* * * * *